(12) United States Patent  (10) Patent No.: US 8,352,117 B2
Martin                    (45) Date of Patent:     Jan. 8, 2013

(54) TURBINE COMPONENT TRACKING SYSTEM

(75) Inventor: Richard J. Martin, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 12/726,589

(22) Filed: Mar. 18, 2010

(65) Prior Publication Data

US 2010/0169191 A1 Jul. 1, 2010

Related U.S. Application Data

(62) Division of application No. 10/669,862, filed on Sep. 24, 2003, now Pat. No. 7,698,030.

(51) Int. Cl.
 *G01M 17/00* (2006.01)
(52) U.S. Cl. ....... 701/29.6; 701/31.6; 700/115; 702/183
(58) Field of Classification Search ................ 701/29, 701/30, 99, 100; 702/182–184, 187–188; 73/112; 700/115, 215
See application file for complete search history.

(56) References Cited

U.S. PATENT DOCUMENTS

| | | |
|---|---|---|
| 4,280,185 A | 7/1981 | Martin |
| 4,746,858 A | 5/1988 | Metala et al. |
| 5,042,295 A | 8/1991 | Seeley |
| 5,140,528 A | 8/1992 | Swaminathan et al. |
| 5,887,176 A | 3/1999 | Griffith et al. |
| 6,343,251 B1* | 1/2002 | Herron et al. ................ 701/100 |
| 6,438,447 B1 | 8/2002 | Belka et al. |
| 6,521,355 B1* | 2/2003 | Fasano et al. ................ 428/621 |
| 6,542,856 B2 | 4/2003 | Frantz et al. |
| 6,636,813 B1 | 10/2003 | Isobe et al. |
| 6,668,272 B1 | 12/2003 | Keller et al. |
| 6,739,512 B2 | 5/2004 | Guerrero et al. |
| 6,801,871 B2 | 10/2004 | Ishii et al. |
| 6,811,379 B2* | 11/2004 | Fernihough et al. ...... 416/241 R |
| 6,845,306 B2* | 1/2005 | Henry et al. .................... 701/29 |
| 6,871,160 B2 | 3/2005 | Jaw |
| 6,885,903 B2 | 4/2005 | Olle et al. |
| 6,915,236 B2* | 7/2005 | Tanner et al. ................ 702/183 |
| 7,789,024 B2* | 9/2010 | Muirhead .................. 108/51.11 |
| 7,880,611 B2* | 2/2011 | Angell et al. ................ 340/540 |
| 2002/0114701 A1* | 8/2002 | Coulson .................... 416/241 R |
| 2002/0184246 A1* | 12/2002 | Shkolnik ........................ 707/203 |
| 2003/0084019 A1* | 5/2003 | Woodmansee .................... 707/1 |
| 2003/0094493 A1 | 5/2003 | Guerrero et al. |
| 2003/0097315 A1* | 5/2003 | Guerrero et al. ................ 705/28 |
| 2005/0241548 A1* | 11/2005 | Muirhead .................... 108/51.3 |

* cited by examiner

*Primary Examiner* — Helal A Algahaim

(57) ABSTRACT

A turbine component tracking system is provided. The turbine component tracking system is advantageously adapted to determine the remaining life of individual turbine components based on how and where they are used as well as if and how they are repaired. The turbine system is also advantageously adapted to track and analyze design, manufacturing and repair changes or modifications performed on turbine components.

20 Claims, 3 Drawing Sheets

| Serial Number | Part Description | Total Life Hrs. | Remaining Life Equiv Hrs. | Consumed Life Equiv Hrs/Strts | Hrs/Strts to Refurbishment | Refurb Interval Equiv Hrs/Strts | Power Producer | Power Plant | Unit No. | Design Change | Manuf Change | Dates In Use | Currently In Use |
|---|---|---|---|---|---|---|---|---|---|---|---|---|---|
| N1V12576 | W501FD2 R1 Vane | 48,000 | 32,028 | 15,972/750 | 28/50 | 16,000/800 | Ace Energy | River City | 3 | N/a | N/a | 1/7/1998 to 3/15/2000 | |
| N1V12576 | W501FD2 R1 Vane | 48,000 | 32,028 | 15,972/0 | 16,000/800 | 16,000/800 | Ace Energy | In Stores | N/a | 57b | N/a | Refurbished on 4/15/2000 | |
| N1V12576 | W501FD2 R1 Vane | 48,000 | 31,850 | 16,150/10 | 15,850/750 | 16,000/800 | Ace Energy | Southern | 8 | 57b | N/a | 9/20/2001 | Y |

Figure 3

| Serial Number | Part Description | Total Life Hrs. | Remaining Life Equiv Hrs. | Consumed Life Equiv Hrs/Strts | Hrs/Strts to Refurbishment | Refurb Interval Equiv Hrs/Strts | Power Producer | Power Plant | Unit No. | Design Change | Manuf Change | Dates In Use | Currently In Use |
|---|---|---|---|---|---|---|---|---|---|---|---|---|---|
| N1V12576 | W501FD2 R1 Vane | 48,000 | 47,850 | 150/4 | 15,850/796 | 16,000/800 | Ace Energy | River City | 3 | N/a | N/a | 11/5/2001 | Y |
| N1V11327 | W501FD2 R1 Vane | 54,000 | 51,980 | 2,020/20 | 15,980/980 | 18,000/980 | Ace Energy | River City | 3 | 57c | N/a | 11/5/2001 | Y |
| N1V12752 | W501FD2 R1 Vane | 54,000 | 52,020 | 1,980/30 | 16,020/920 | 18,000/950 | Ace Energy | River City | 3 | 57c | N/a | 11/5/2001 | Y |

Figure 4

TURBINE COMPONENT TRACKING SYSTEM

CROSS REFERENCE TO RELATED APPLICATIONS

This is a divisional application of U.S. patent application Ser. No. 10/669,862, filed Sep. 24, 2003 now U.S. Pat. No. 7,698,030.

FIELD OF THE INVENTION

This invention relates generally to the field of component tracking systems and in particular, to a turbine component tracking system adapted to determine the remaining life of individual turbine components based on how and where they are used as well as if and how they are repaired, and also in particular to a turbine component tracking system adapted to track and analyze design, manufacturing and repair changes or modifications performed on turbine components.

BACKGROUND OF THE INVENTION

Gas turbine engines are known to include a compressor section for supplying a flow of compressed combustion air, a combustor section for burning fuel in the compressed combustion air, and a turbine section for extracting thermal energy from the combustion air and converting that energy into mechanical energy in the form of a rotating shaft.

Modern high efficiency combustion turbines have firing temperatures that exceed about 2,700° F., and even higher firing temperatures are expected as the demand for more efficient engines continues. Many components that form the "hot gas path" combustor and turbine sections are directly exposed to aggressive hot combustion gasses, for example, the combustor liner, the transition duct between the combustor and turbine sections, and the turbine stationary vanes and rotating blades and surrounding ring segments. In addition to thermal stresses, these and other components are also exposed to mechanical stresses and loads that further wear on the components. Other turbine components, such as electronic and mechanical controllers, fuel metering equipment, auxiliaries, load packages including generators and exciters, and valves similarly receive in-service wear.

It is known to perform detailed periodic scheduled maintenance of turbine components based upon benchmark manufacturer recommendations developed from engineered design parameters in view of anticipated turbine operation conditions. However, a shortcoming of this methodology is that actual turbine operating conditions often appreciably differ from the anticipated turbine operating conditions due to intentional (e.g. running the turbine at higher combustion temperatures) or unintentional (e.g. non-optimal shutdowns, trips, fast cool downs, water washing, and fuel nozzle water purges) reasons. Thus, the components commonly experience temperatures, cycles, loads, stresses, strains, etc. that are greater or less than for which they were designed. Accordingly, Type I and II errors occur in connection with the periodic scheduled maintenance, that is, maintenance is performed when the turbine components are fine (Type I) and maintenance is not performed when the turbine components need to be repaired, refurbished or replaced (Type II).

Several approaches have been taken to address this shortcoming. One approach involves developing less expensive and time consuming inspection and maintenance procedures, such as non-destructive and in-operation examination of the turbine components, for example those described in U.S. Pat. Nos. 4,746,858 and 5,140,528. Another approach involves creating individualized maintenance schedules uniquely associated with and based on the actual operating history of a particular turbine, for example that described in U.S. Pat. No. 6,343,251.

If a unique individual turbine maintenance schedule is created, a problem arises if an individual turbine component is used on more than one turbine. Another problem arises if a component type (e.g. row 1 blade) is not identical with another similar component type (e.g. row 1 blade), for example, if one row 1 blade was manufactured with one type of ceramic thermal barrier coating and another row 1 blade was manufactured with another type of ceramic thermal barrier coating, this difference is not addressed. Another problem arises if some individual component types are repaired or replaced while other individual component types are not repaired or replaced within the turbine. Oftentimes, some components are replaced that still have serviceable life in them to "reset" the clock on the repair cycle.

Accordingly, there is a need for additional approaches to reduce maintenance costs and improve upon the prior art.

SUMMARY OF THE INVENTION

A turbine component tracking system is provided. The turbine component tracking system is advantageously adapted to determine the remaining life of individual turbine components based on how and where they are used as well as if and how they are repaired. The turbine system is also advantageously adapted to track and analyze design, manufacturing and repair changes or modifications performed on turbine components.

One aspect of the present invention involves a turbine component tracking system, comprising: a plurality of marked turbine components; at least one turbine control system adapted to obtain operational data for the turbine components; and a central processing station operatively connected to the at least one turbine control system and adapted to upload the operational data from the at least one turbine control system, whereby desired turbine component specific information is determined and output by the central processing station for turbine component tracking purposes.

Another aspect of the present invention involves a method of tracking turbine components, comprising: marking a plurality of turbine components; placing the turbine components in a plurality of turbines; operating the turbines; obtaining operational data from the turbines via at least one turbine control system; uploading the operation data from the turbine control systems to a central processing station; and using the uploaded data at the central processing station to track desired aspects of the turbine components.

BRIEF DESCRIPTION OF THE DRAWINGS

These and other advantages of the invention will be more apparent from the following description in view of the drawings that include:

FIG. 3 is an exemplary database listing of information for a tracked turbine component; and FIG. 4 is an exemplary database listing of information for a plurality of tracked turbine components.

DETAILED DESCRIPTION OF THE INVENTION

The invention described herein employs several basic concepts. For example, one concept relates to a system for tracking turbine components from when the component is manufactured, through its use in a turbine, to any repair or refurbishment performed on the component, and to any subsequent use in the same or different turbine. Another concept relates to a method of tracking turbine components to help coordinate or match new and used turbine components with turbines having needs for a particular new or used turbine component. Another concept relates to a system that allows changes or modifications to a turbine component, whether during the design, manufacturing or repair process, and whether intentional or unintentional, to be tracked and analyze; thus dynamic changes to a turbine component throughout its life can be tracked.

The present invention is disclosed in context of use as a tracking system for a turbine component 2 to be used within a combustion turbine engine. The principles of the present invention, however, are not limited to turbine components 2 to be used within a combustion turbine engine or even to turbine components 2. For example, the principles of the present invention can be used to track other components that can be used in more than one place and/or can be repaired or refurbished one or more times, such as power plant boilers, coal grinding ball mills, boiler fans, industrial engines or any other high maintenance or high wear item that is systematically repaired, replaced or refurbished. One skilled in the art may find additional applications for the apparatus, processes, systems, components, configurations, methods, and applications disclosed herein. Thus, the illustration and description of the present invention in context of an exemplary turbine component 2 tracking system is merely one possible application of the present invention.

Figure 1:
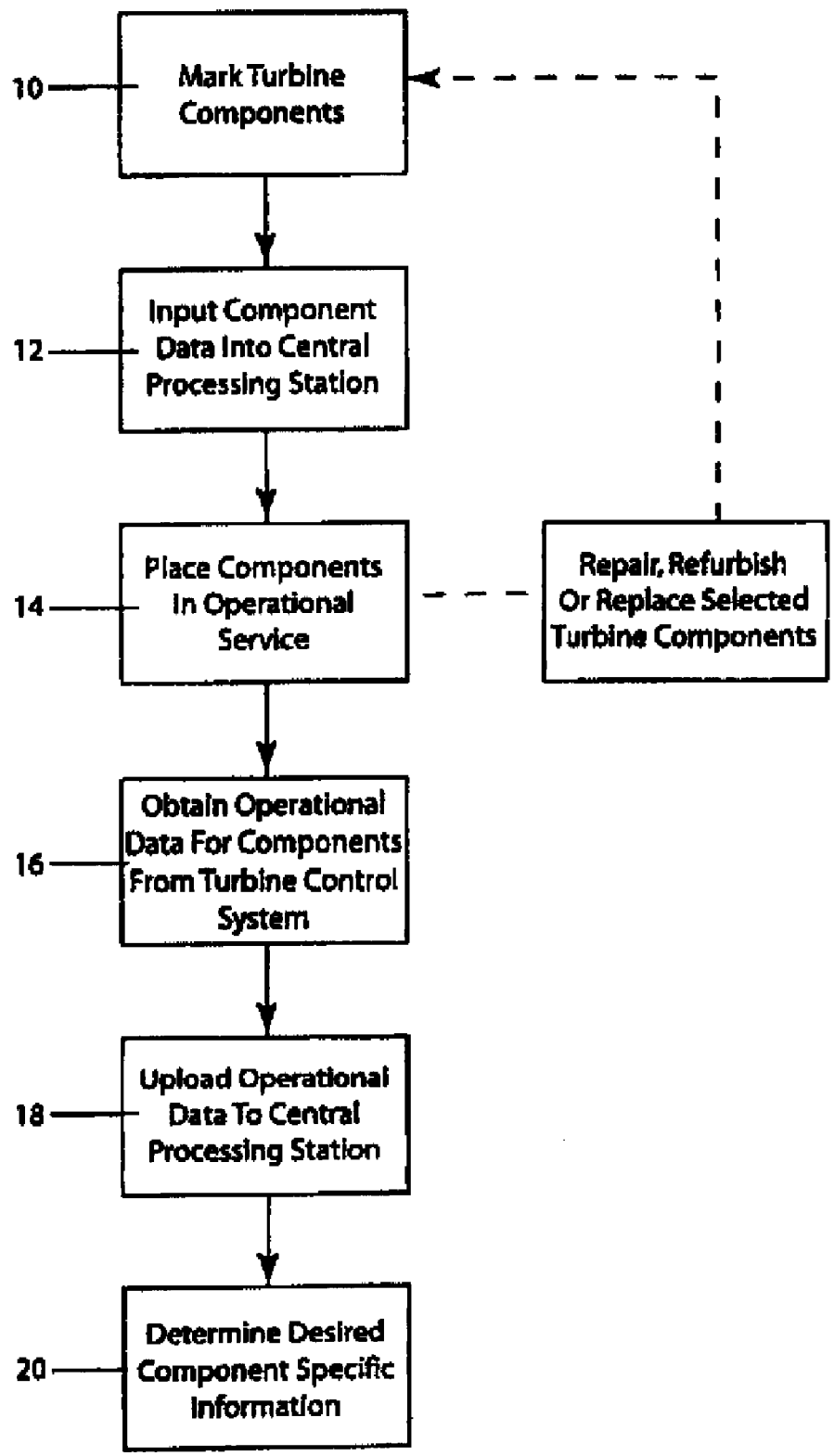
FIG. 1 is a flowchart of an exemplary turbine component tracking system of the present invention.

Referring now to FIG. 1, an exemplary flowchart of a turbine component tracking system is provided.

Step 1, illustrated as reference number 10, depicts turbine components marked or coded with identifying indicia. This can be performed at any time during or after the manufacture of the component. The indicia may be any suitable identifier, such as a serial number, bar code, combinations thereof and the like. For example, commonly assigned U.S. Patent Application Publication Nos. US-2003-0094493 and US-2003-0097315-A1, each of which are incorporated by reference herein in their entirety, disclose applying a bumpy bar code to a portion of a component during the manufacturing process. For another example, the indicia may be a plurality of serial numbers separately applied to the turbine component for separate reasons, such as a first serial number to identify the metallic base material applied by one manufacturing facility and a second serial number to identify the ceramic coating material applied by another manufacturing facility and another manufacturing facility. For another example, the indicia could identify scrap.

Step 2, illustrated as reference number 12, depicts the marked turbine components data inputted into a central processing station, such as a computer client-server system. This input could be performed by manual data entry techniques or by automated techniques such as bar code readers operatively connected to the client-server system.

Step 3, illustrated as reference number 14, depicts the turbine components placed in operational service in one or more turbines. Typically the components may be placed in service throughout a fleet of dozens or hundreds if not thousands of turbines. The turbine components may include hot gas path components or other components as explained above or understood by those skilled in the art.

Step 4, illustrated as reference number 16, depicts the turbine control systems for the turbines within which turbine components are located obtaining operating data regarding the environment in which the turbine components operate. The turbine control system may be presently known, such as Siemens Westinghouse's TXP™ turbine control system, or later developed. Of course, data collection techniques other than the turbine control system could be used to obtain the turbine operating data, such as manual charts and graphs. This operational data may include equivalent base hours (EBH), equivalent starts (ES), maximum and average combustion and blade row temperatures and pressures, fuel type, number of starts, number of aborted starts, runbacks, fast stops, trips, load changes, fast cool down cycles, water washing, fuel nozzle purging, wet compression operating parameters, inlet fogging operating parameters, combinations thereof and the like. As is understood by those skilled in the art, other suitable operational data can also be obtained, such as that described in U.S. Pat. No. 6,343,251.

Figure 2:
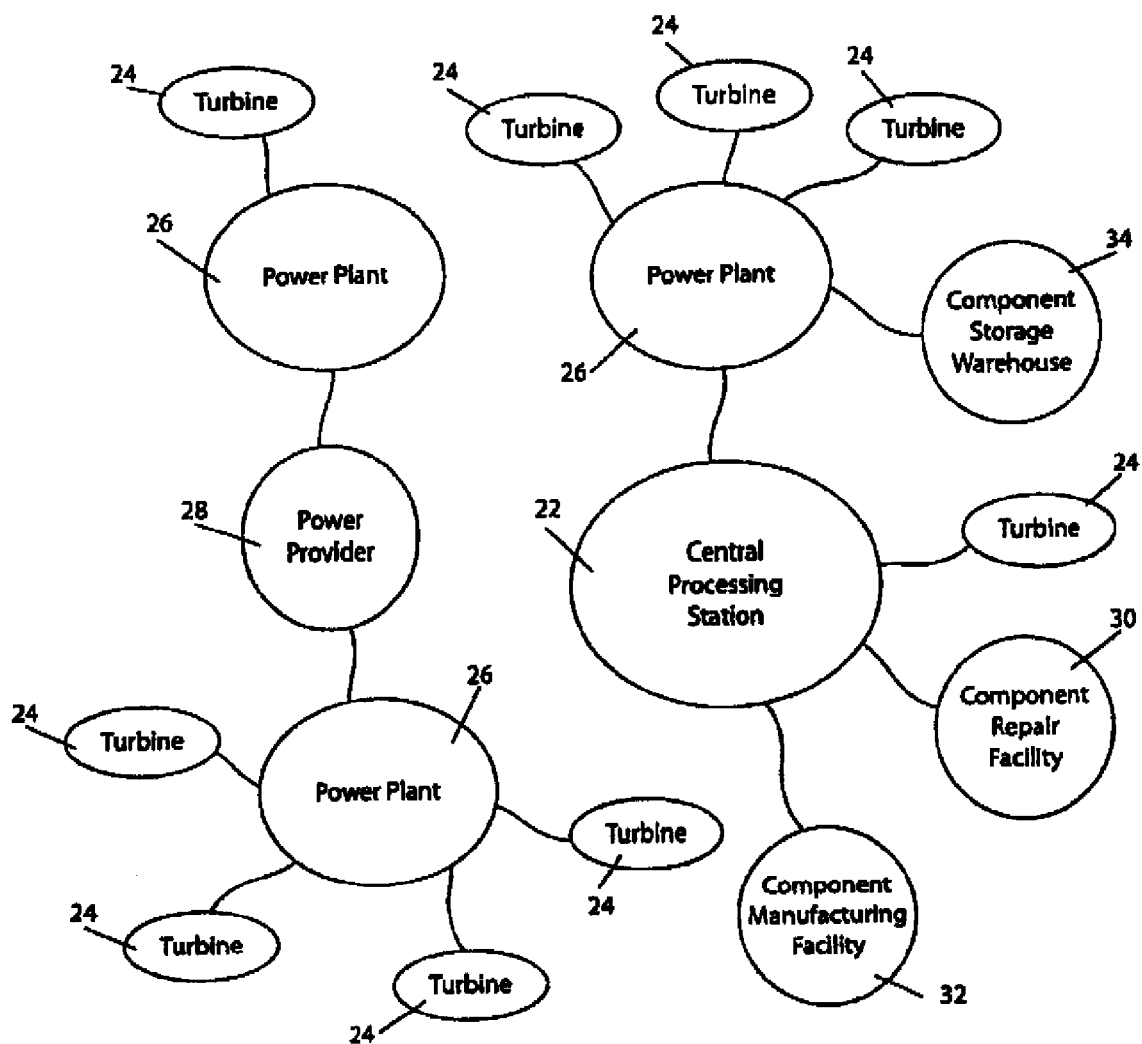
FIG. 2 is a schematic diagram of an exemplary architecture for the central turbine component tracking system.

Step 5, illustrated as reference number 18, depicts downloading the operating data from the turbine control systems and uploading it to the central processing station. This downloading and uploading is advantageously performed by computerized techniques such as internet-based data transfers or point-to-point modem or cable communications systems, and are advantageously automated such that the download and upload is performed without active human involvement, although there is not requirement for the technique to be automated or computerized. For example, the downloads could be performed by manual data entry techniques. FIG. 2 illustrates an exemplary turbine tracking system architecture that is electronically interconnected to a plurality of turbine control systems and adapted to download operational data from the turbine control systems and upload such data to the central processing station 22. The operational data may be provided directly from the turbine control systems 24 or through an intermediary power plant 26 or power producer 28 site or other intermediary. The operational data need not be fully integrated into the central processing station, for example, operation data from one or more power plants or power producers could remain with and be used by that power plant or power producer without being uploaded to or integrated with the central processing station. Still referring to FIG. 2, other facilities may be integrated into the central processing station 22, such as a component repair facility 30, a component manufacturing facility 32, or a component storage warehouse 34; alternatively, one or more of the facilities could remain independent of the central processing facility and only be integrated with one or more power plants or power producers.

Step 6, illustrated as reference number 20, depicts the central processing station using the uploaded operational data to track the turbine components and advantageously determine or calculate remaining life of the turbine components or other component-specific information. If remaining life is tracked, it can be determined in a variety of ways based on the operational data as will be understood by those skilled in the art, such as that described in U.S. Pat. No. 6,343,251. Other operational-based and non-operational-based data, such as consumed life, repair operations, turbines in which used, also may be determined as will be understood by those skilled in the art. FIGS. 3 and 4 show exemplary data lists that can be generated by the central processing station displaying certain turbine component data including serial numbers, part description, remaining life, consumed life, repair operations, power plants used in, turbines used in, location within turbine, component design modifications, and component manufacturing modifications.

By the above-described configuration, individual turbine components and operational data associated with the individual turbine components can be tracked from when the components are manufactured, through their use in a turbine, to any repair or refurbishment performed on each component, and to any subsequent use in the same or different turbine. Failed components could be positively noted to prevent their inadvertent use. Additionally, the tracking system allows for new or repaired turbine components to be coordinated or matched with turbines having particular turbine component needs. Further, the tracking system allows for changes or modifications to a turbine component to be tracked and analyzed, whether such changes or modifications occur during the design process (e.g. new ceramic thermal barrier coating composition, during the manufacturing process (e.g. higher temperature superalloy heat treatment) or during repair (e.g. experimental metal powder filler material applied to sensitive repair site) and the like. Also, the tracking system allows for detailed identification of subcomponents, compositions and other features of the individual components, such as the particular superalloy material composition a blade was made of or the assembly route and conditions that a combustor liner experienced. Further, the tracking system allows for statistical analysis of the turbine components based on the data at the central processing station.

The above-described steps need not be performed in the sequence illustrated in above and in FIG. 1. Also, all steps need not be performed and additional steps may be performed between, before or after the above-described steps.

While the preferred embodiments of the present invention have been shown and described herein, it will be obvious that such embodiments are provided by way of example only. Numerous variations, changes and substitutions will occur to those of skill in the art without departing from the invention herein. Also, one or more aspects or features of one or more embodiments or examples of the present invention may be used or combined with one or more other embodiments or examples of the present invention. Accordingly, it is intended that the invention be limited only by the spirit and scope of the appended claims.

I claim as my invention:

1. A turbine component tracking system, comprising:
    a plurality of marked turbine components, wherein the marking on the turbine component identifies a material composition from which at least a portion of the turbine component was manufactured;
    at least one turbine control system adapted to obtain operational data for the turbine components; and
    a central processing station operatively connected to the at least one turbine control system and adapted to upload the operational data from the at least one turbine control system,
    whereby desired turbine component specific information is determined and output by the central processing station for turbine component tracking purposes including the material composition from which the portion of the turbine component was manufactured.

2. The system of claim 1, wherein the turbine components are marked with a bar code or a serial number.

3. The system of claim 1, wherein a plurality of indicia are used to mark the turbine components.

4. The system of claim 1, wherein the turbine control system is TXP control system.

5. The system of claim 1, wherein the turbine control system continuously updates the operational data for each turbine component.

6. The system of claim 1, wherein the central processing station is remotely located from the turbine control system.

7. The system of claim 1, wherein the central processing station receives the operational data via electronic uploads from the internet.

8. The system of claim 1, wherein the plurality of marked turbine components include turbine components for a plurality of turbines.

9. The system of claim 1, wherein the plurality of marked turbine components include markings on a surface of the components.

10. A turbine component tracking system, comprising:
    a plurality of marked turbine components, wherein the marking on the component identifies a manufacturing step from which at least a portion of the turbine component was manufactured;
    at least one turbine control system adapted to obtain operational data for the turbine components; and
    a central processing station operatively connected to the at least one turbine control system and adapted to upload the operational data from the at least one turbine control system,
    whereby desired turbine component specific information is determined and output by the central processing station for turbine component tracking purposes including identifying a manufacturing step from which the portion of the turbine component was manufactured.

11. The system of claim 10, wherein the turbine components are marked with a bar code or a serial number.

12. The system of claim 10, wherein a plurality of indicia are used to mark the turbine components.

13. The system of claim 10, wherein the turbine control system is TXP control system.

14. The system of claim 10, wherein the turbine control system continuously updates the operational data for each turbine component.

15. The system of claim 10, wherein the central processing station is remotely located from the turbine control system.

16. The system of claim 10, wherein the central processing station receives the operational data via electronic uploads from the internet.

17. The system of claim 10, wherein the plurality of marked turbine components include turbine components for a plurality of turbines.

18. The system of claim 10, wherein the plurality of marked turbine components include markings on a surface of the components.

19. A turbine component tracking system, comprising:
    a plurality of marked turbine components, wherein the marking on the turbine component identifies a repair procedure that at least a portion of the turbine component underwent;
    at least one turbine control system adapted to obtain operational data for the turbine components; and
    a central processing station operatively connected to the at least one turbine control system and adapted to upload the operational data from the at least one turbine control system,
    whereby desired turbine component specific information is determined and output by the central processing station for turbine component tracking purposes including the identification of the repair procedure that the portion of turbine component underwent.

20. The system of claim 19, wherein the turbine components are marked with a bar code or a serial number.

* * * * *